United States Patent
Tan

(10) Patent No.: US 7,210,690 B2
(45) Date of Patent: May 1, 2007

(54) DIRECTION-LIMITING DEVICE FOR STROLLER

(76) Inventor: Yi-Cheng Tan, 5F-3, No. 82, Chuang-Ching Road, Tainan City (TW)

(*) Notice: Subject to any disclaimer, the term of this patent is extended or adjusted under 35 U.S.C. 154(b) by 175 days.

(21) Appl. No.: 11/130,109

(22) Filed: May 17, 2005

(65) Prior Publication Data

US 2006/0261565 A1    Nov. 23, 2006

(51) Int. Cl.
*B60B 33/02* (2006.01)
*B62B 7/04* (2006.01)

(52) U.S. Cl. .................................. 280/47.38; 16/35 R
(58) Field of Classification Search ............ 280/47.38, 280/642, 647, 650; 16/35 R
See application file for complete search history.

(56) References Cited

U.S. PATENT DOCUMENTS

| | | | | |
|---|---|---|---|---|
| 3,890,668 A * | 6/1975 | Stosberg et al. | ............ | 16/35 R |
| 4,028,773 A * | 6/1977 | Morgan | ...................... | 16/35 R |
| 4,336,629 A * | 6/1982 | Jarvis et al. | ................. | 16/35 R |
| 4,349,938 A * | 9/1982 | Fontana | ...................... | 16/35 R |
| 5,461,753 A * | 10/1995 | Rounds | ........................ | 16/21 |
| 5,590,896 A * | 1/1997 | Eichhorn | .................... | 280/642 |
| 5,660,435 A * | 8/1997 | Eichhorn | ............... | 297/219.12 |
| 5,669,624 A * | 9/1997 | Eichhorn | .................... | 280/642 |
| 6,315,309 B1 * | 11/2001 | Li et al. | .................. | 280/47.38 |
| 6,402,166 B1 * | 6/2002 | Chiu | ........................ | 280/47.38 |
| 6,449,801 B1 * | 9/2002 | Durrin | ............................ | 16/47 |
| 6,584,641 B1 * | 7/2003 | Milbredt | ..................... | 16/35 R |
| 6,671,926 B2 * | 1/2004 | Huang | ........................ | 16/35 R |
| 6,779,804 B1 * | 8/2004 | Liu | ........................ | 280/47.38 |
| 6,871,380 B2 * | 3/2005 | Chen | .......................... | 16/35 R |
| 6,974,150 B2 * | 12/2005 | Jane Santamaria | .......... | 280/647 |
| 7,021,651 B2 * | 4/2006 | Lan | ............................ | 280/642 |
| 7,083,175 B1 * | 8/2006 | Liu | ........................ | 280/47.38 |
| 2004/0226134 A1 * | 11/2004 | Chen | .......................... | 16/35 R |
| 2005/0121865 A1 * | 6/2005 | Liao | ............................ | 280/38 |
| 2006/0043688 A1 * | 3/2006 | Chang | ..................... | 280/47.38 |

* cited by examiner

*Primary Examiner*—Jeff Restifo
(74) *Attorney, Agent, or Firm*—Rosenberg, Klein & Lee

(57) ABSTRACT

A direction-limiting device for a stroller includes a mounting seat, a wheel assembly, and a direction-limiting device. The mounting seat includes a base coupled to a frame of a stroller. The wheel assembly includes a frame having a positioning hole. The direction-limiting mechanism includes a press button and a positioning member. When the press button is in an initial position, a lower end of the positioning member is disengaged from the positioning hole to allow free pivotal movement of the wheel assembly relative to the base. When the press button is pressed and then released, the lower end of the positioning member is engaged in the positioning hole, allowing joint movement of the wheel assembly and the base. Thus, even moving on a rugged road or hitting a bump on a road, the stroller will move straightly forward or rearward without the risk of turning over.

4 Claims, 17 Drawing Sheets

DIRECTION-LIMITING DEVICE FOR STROLLER

BACKGROUND OF THE INVENTION

1. Field of the Invention

The present invention relates to a direction-limiting device. In particular, the present invention relates to a direction-limiting device for a stroller or the like.

2. Description of the Related Art

A stroller is convenient to users having a child for outdoor activities. A typical stroller comprises a pivotable wheel assembly to allow steering of the stroller. However, in a case that the stroller is moving rectilinearly on a rugged road or hits a bump on a road at a high speed, the stroller may turn suddenly and thus turn over, leading to injury to the child in the stroller.

SUMMARY OF THE INVENTION

A direction-limiting device for a stroller in accordance with the present invention comprises a mounting seat, a wheel assembly, and a direction-limiting device. The mounting seat comprises a base coupled to a frame of a stroller. The base comprises a holed seat and a through-hole. The holed seat includes a shoulder in a lower end thereof and a hole.

The wheel assembly comprises a frame pivotally connected to the base and a wheel rotatably supported by the frame. The frame comprises a positioning hole in a top side thereof.

The direction-limiting mechanism comprises a sleeve, a press button, a rotary member, a pressing member, a first elastic member, a positioning member, and a second elastic member.

The sleeve comprises a lower end securely received in the holed seat of the base and an upper end. The sleeve further comprises a longitudinal hole delimited by an inner periphery. A plurality of annularly spaced ribs are formed on the inner periphery of the sleeve and each includes a slanted bottom face. The ribs are spaced by a plurality of protrusions and a plurality of grooves that are alternately disposed. Each protrusion includes a bottom retaining edge.

The press button comprises a lower end slidably received in the upper end of the sleeve and an upper end for manual operation. A plurality of annularly spaced protruded guiding sections are formed on an outer periphery of the lower end of the press button and each has a slanted bottom face. A projection is formed between a pair of the protruded guiding sections adjacent to each other and includes a substantially inverted V-shaped downwardly facing groove.

The rotary member comprises an upper end received in the press button and a lower end. A flange is formed on an outer periphery of the lower end of the rotary member. A plurality of annularly spaced guide ribs extend from the flange and each includes a slanted top face and an apex, with a recession being defined between a pair of the guide ribs adjacent to each other.

The pressing member is mounted to an underside of the rotary member. The positioning member is mounted in the sleeve and below the pressing member. The positioning member includes a lower end. The second elastic member is mounted between the pressing member and the shoulder of the holed seat of the base. The first elastic member is mounted inside the second elastic member and between the pressing member and the positioning member.

When the press button is in an initial position, some of the protruded guiding sections are received in the grooves of the sleeve and the other protruded guiding sections are superimposed on the protrusions of the sleeve. The apex of each guide rib is accommodated in an associated one of the downwardly facing grooves of the press button. The lower end of the positioning member is disengaged from the positioning hole of the wheel assembly to allow free pivotal movement of the wheel assembly relative to the base.

When the press button is pressed and then released, the rotary member is moved downward and turned in a direction. The apex of the slanted top face of each guide rib of the rotary member moves across the slanted bottom face of an associated one of the ribs to the bottom retaining edge of an associated one of the protrusions adjacent to the associated rib under the action of returning force of the second elastic member. The lower end of the positioning member is engaged in the positioning hole of the wheel assembly, allowing joint movement of the wheel assembly and the base. Thus, even moving on a rugged road or hitting a bump on a road, the stroller will move straightly forward or rearward without the risk of turning over.

When the press button is pressed again and released, the rotary member is moved downward and turned in the direction. The apex of the slanted top face of each guide rib of the rotary member moves transversely to the slanted bottom face of an adjacent rib. The rotary member and the positioning member are then moved upward under the action of the returning force of the second elastic member. The lower end of the positioning member is disengaged from the positioning hole of the wheel assembly.

Preferably, the mounting seat further comprises a cover mounted on top of the base. The cover comprises a through-hole through which the upper end of the press button extends.

Preferably, the sleeve further comprises a key, and the holed seat comprises a key groove for engaging with the key.

Preferably, the sleeve further comprises an engaging member on an outer periphery thereof, and a screw is extended through the engaging member for fixing the sleeve to the base.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
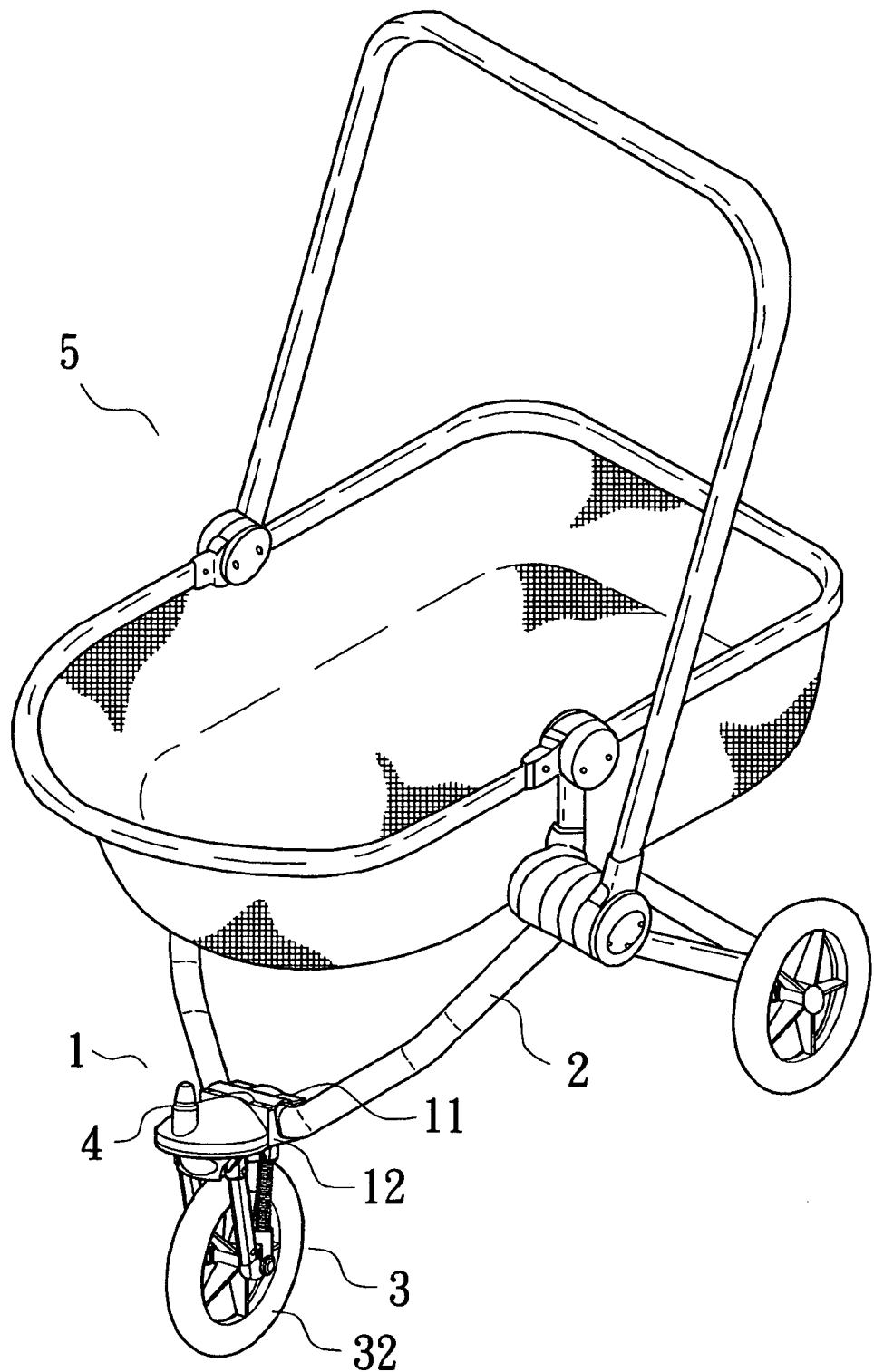
FIG. 1 is a perspective view of a stroller with a direction-limiting device in accordance with the present invention.
Figure 2:
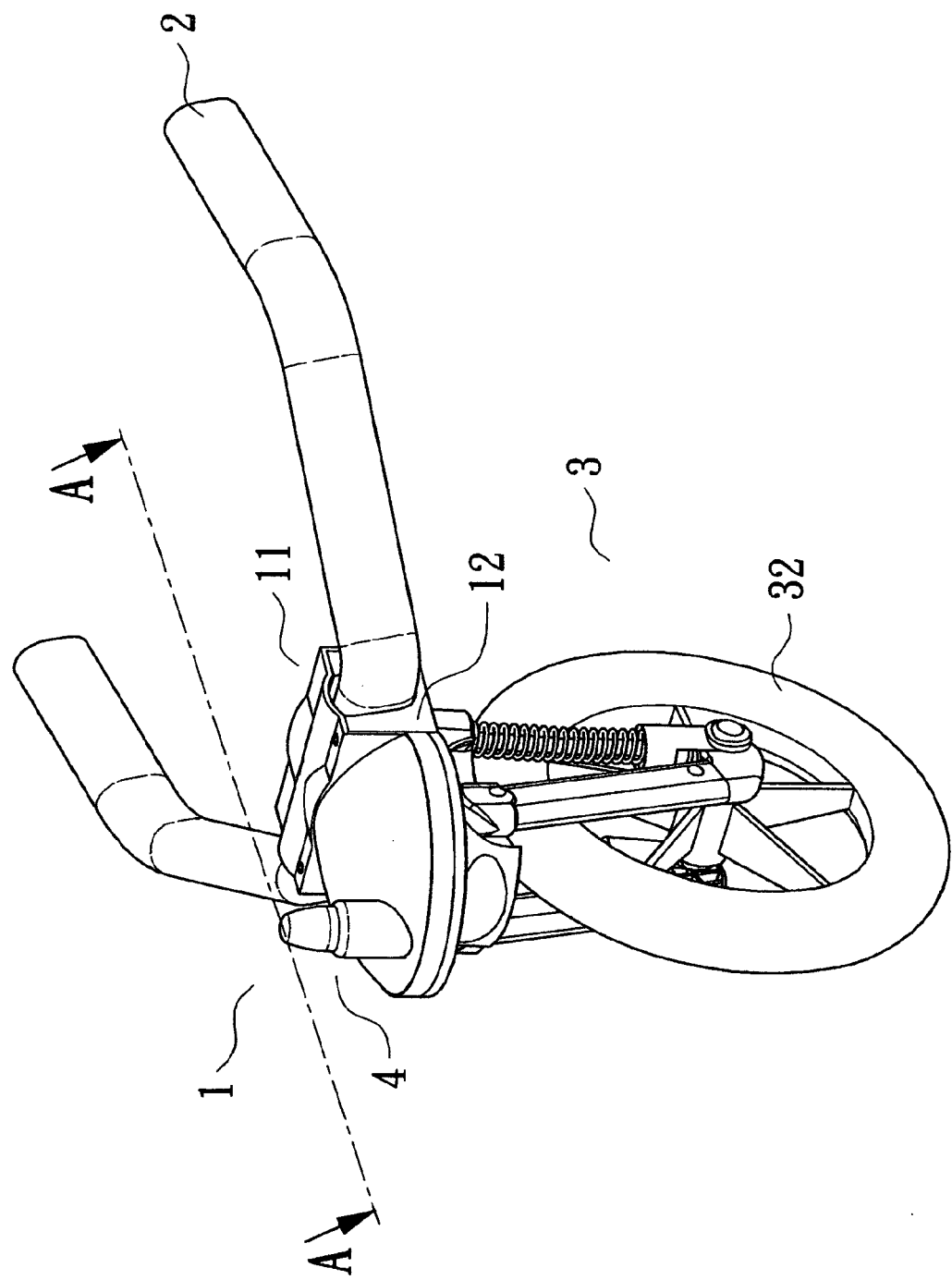
FIG. 2 is a perspective view of a wheel assembly and a mounting seat of the direction-limiting device in accordance with the present invention.
Figure 3:
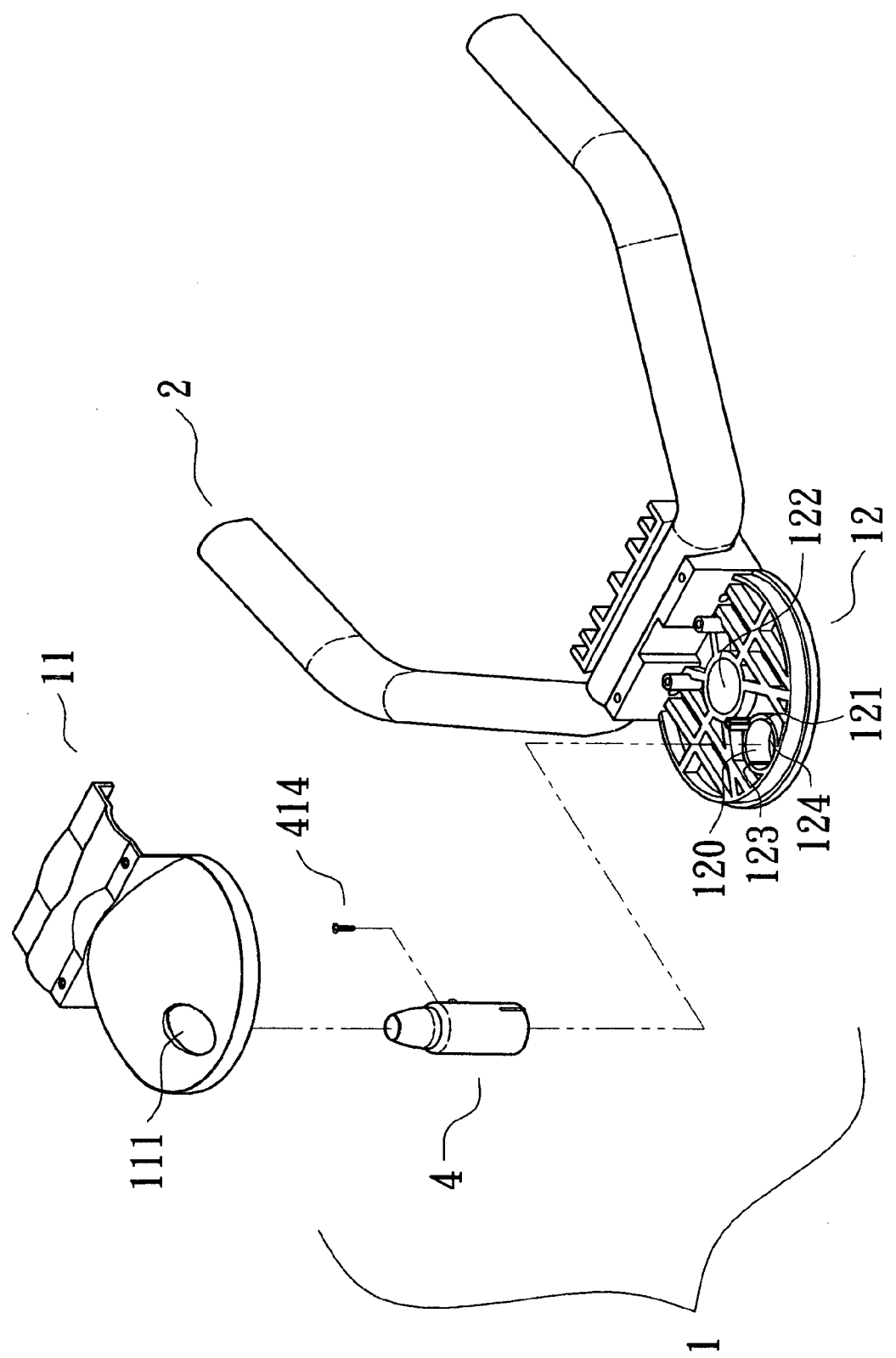
FIG. 3 is an exploded perspective view of the mounting seat of the direction-limiting device in accordance with the present invention.
Figure 4:
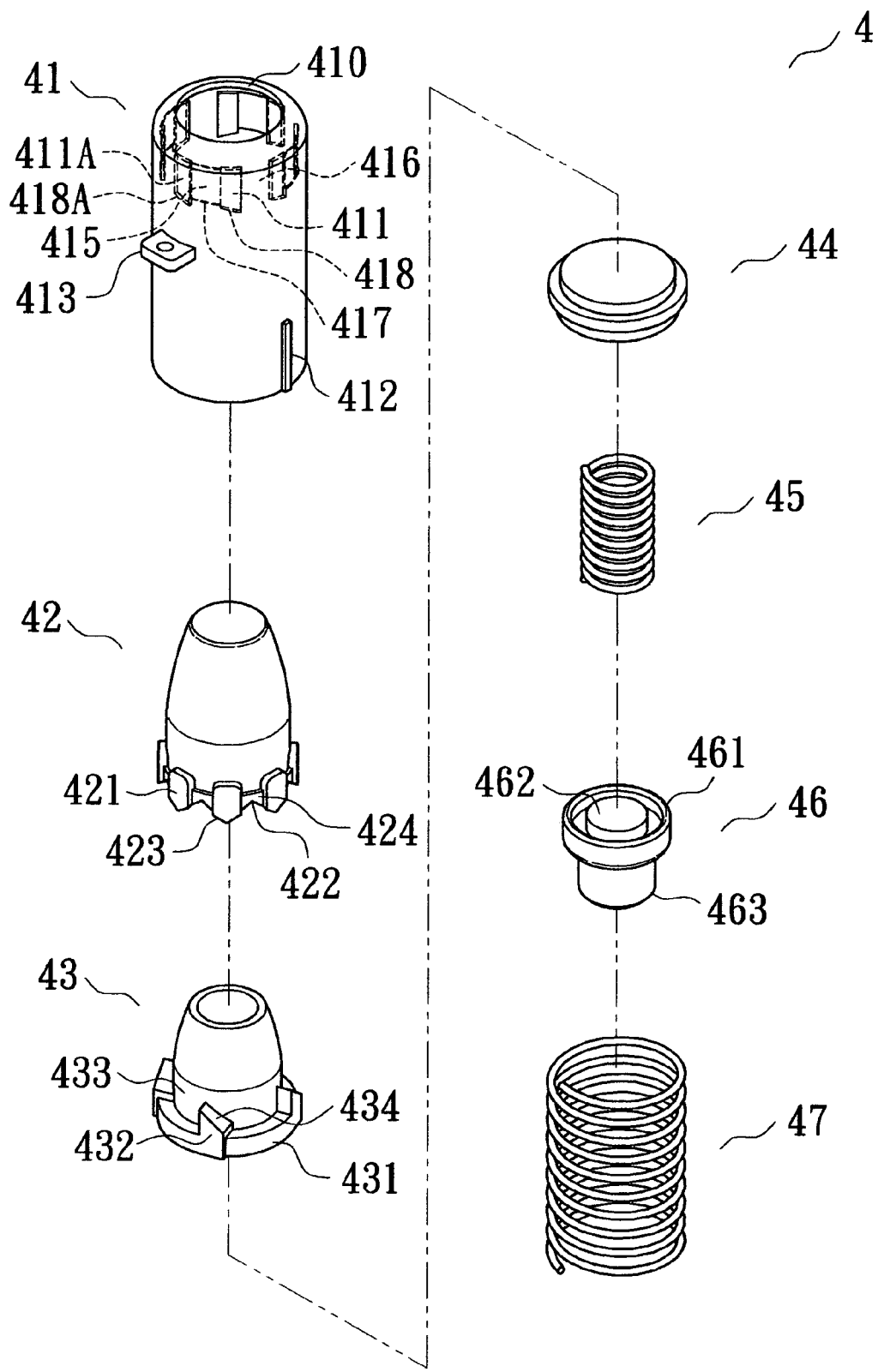
FIG. 4 is an exploded perspective view of a direction-limiting mechanism of the direction-limiting device in accordance with the present invention.
Figure 8:
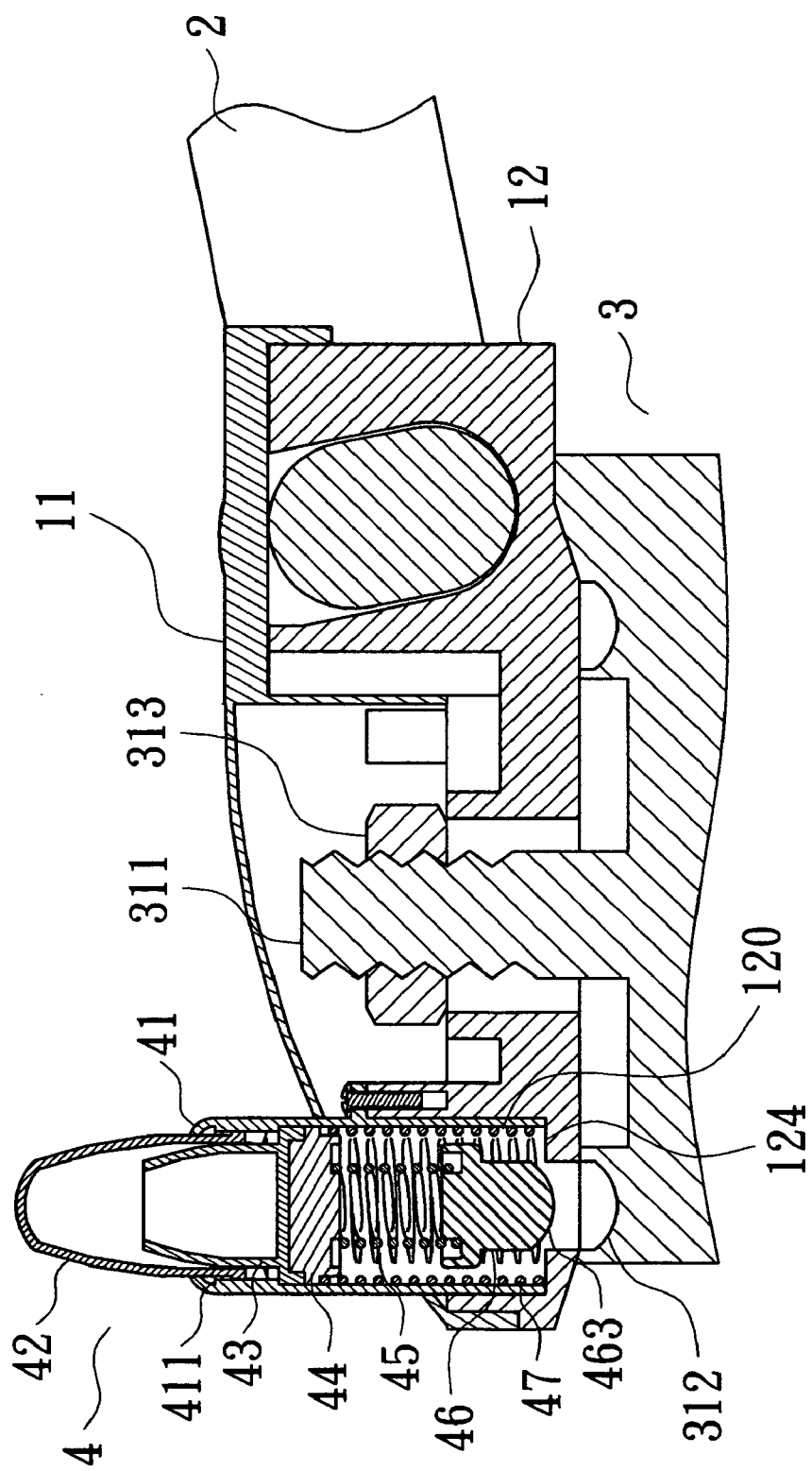
FIG. 8 is a sectional view, taken along plane A—A in FIG. 2, of the direction-limiting device in accordance with the present invention.

Referring to FIGS. 1 and 2, a direction-limiting device in accordance with the present invention is mounted to a stroller 5 and comprises a mounting seat 1 attached to front ends of two extension rods 2 that form a part of a frame of the stroller 5. As illustrated in FIGS. 2 and 3, the mounting seat 1 comprises a base 12 for coupling with the front ends of the extension rods 2. In the illustrated embodiment, the front ends of the extension rods 2 are integrally formed with each other. The base 12 includes a holed seat 121 with a vertical hole 120 and a through-hole 122 adjacent to the holed seat 121 and extending in a direction parallel to the vertical hole 120. A key groove 123 is defined in an inner periphery of the holed seat 121. As illustrated in FIG. 8, the holed seat 121 includes a shoulder 124 in a lower end thereof. The mounting seat 1 further comprises a cover 11 removably mounted on top of the base 12 and having a hole 111.

Figure 5:
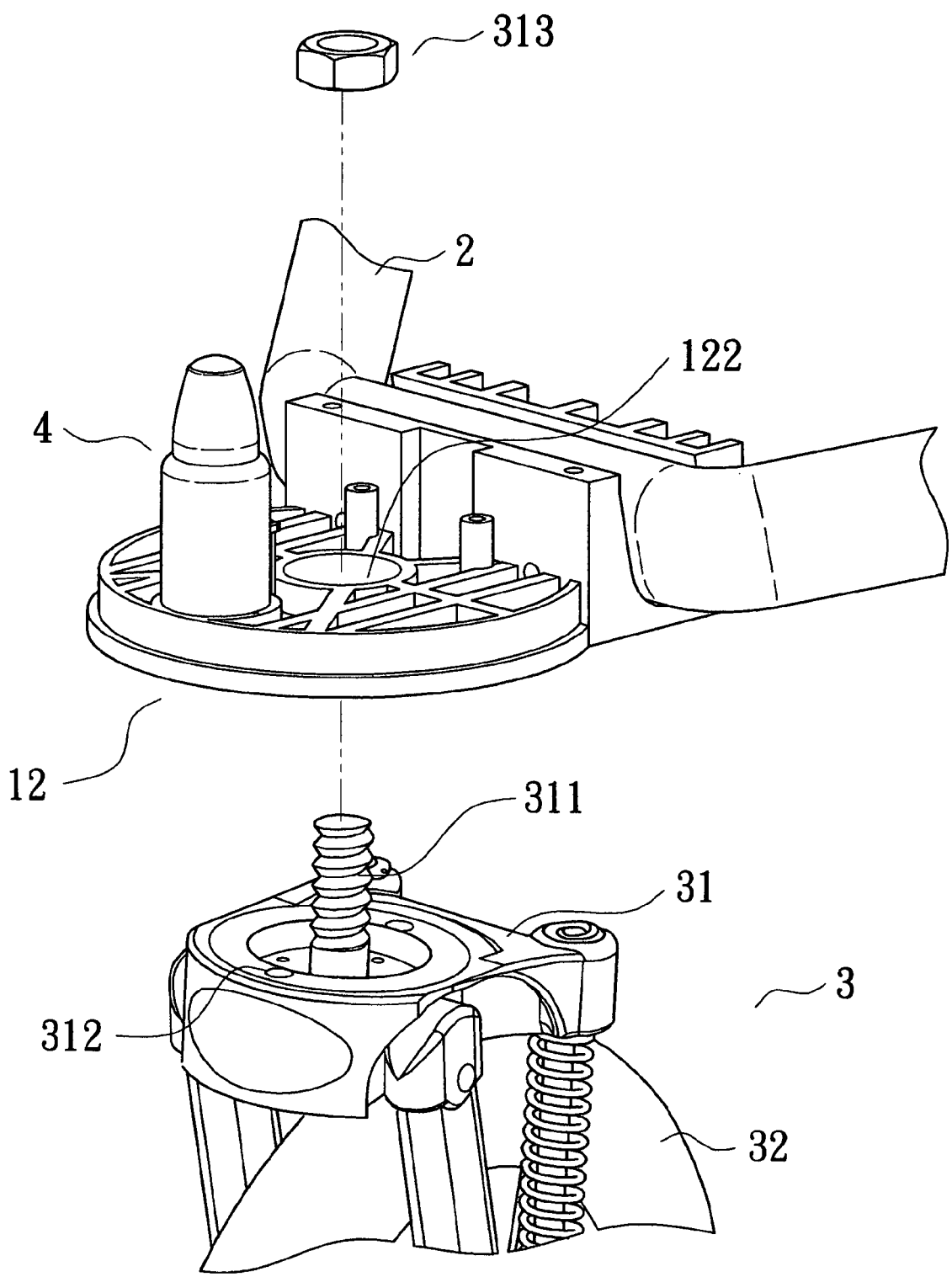
FIG. 5 is an exploded perspective view of the direction-limiting device of the stroller in accordance with the present invention.
Figure 7:
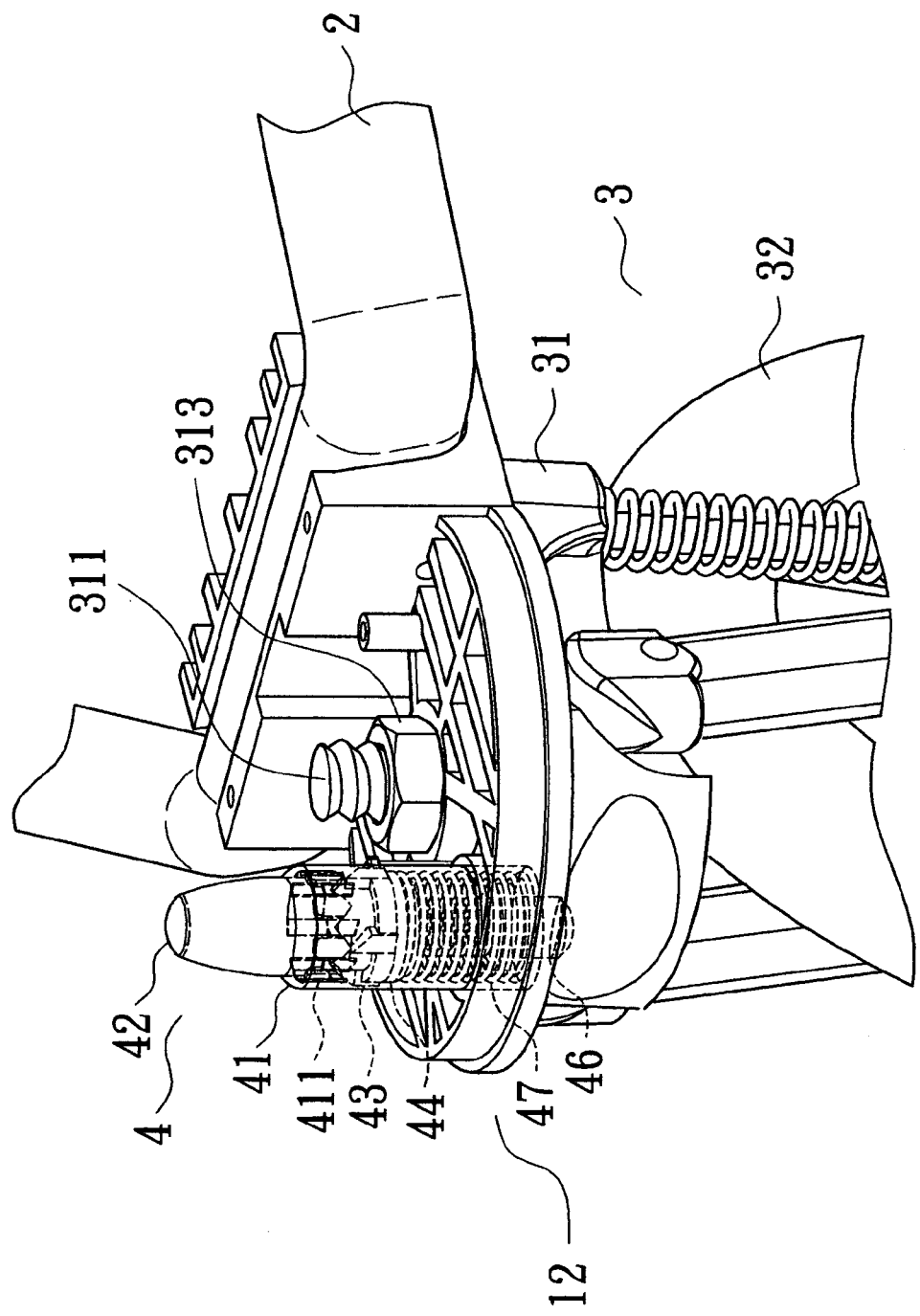
FIG. 7 is a perspective view of the direction-limiting device of the stroller in accordance with the present invention, wherein a cover of the direction-limiting device is removed.

Referring to FIGS. 2 and 5, the direction-limiting device further comprises a wheel assembly 3 including a frame 31 that is mounted to an underside of the base 12. The wheel assembly 3 further includes a wheel 32 rotatably supported below the seat 31. In the illustrated embodiment, a stud 311 projects upright from the frame 31 and extends through the through-hole 122 of the base 12, and a nut 313 is engaged with a threaded upper end of the stud 311 above the base 12, as shown in FIG. 7. Thus, the wheel assembly 3 may pivot freely relative to the base 12. The frame 31 further comprises at least one positioning hole 312 (or slot) in a top side thereof. However, a positioning hole 312 (e.g., the left one in FIG. 5) is sufficient to carry out the required direction-limiting function.

The direction-limiting device in accordance with the present invention further comprises a direction-limiting mechanism 4 for positioning the wheel assembly 3 when desired (i.e., to stop free rotation of the wheel assembly 3 relative to the mounting seat 1).

As illustrated in FIGS. 3, 4, 7, and 8, the direction-limiting mechanism 4 comprises a sleeve 41 having a lower end securely received in the holed seat 121 of the base 12 and an upper end extending outside the cover 11 via the hole 111 of the cover 11. The sleeve 41 includes a longitudinal hole 410 delimited by an inner periphery. Formed on the inner periphery of the sleeve 41 are a plurality of annularly spaced ribs 411 each having a slanted bottom face 418. The ribs 411 are spaced by a plurality of protrusion 415 and a plurality of grooves 416 that are alternately disposed. Each protrusion 415 includes a bottom retaining edge 417. The sleeve 41 further includes a key 412 for engaging with the key groove 123 of the holed seat 121 of the base 12, thereby fixing the sleeve 41. Further, the sleeve 41 may include an engaging member 413, and a screw 414 (FIG. 4) can be extended through the engaging member 413 to fix the sleeve 41 to the base 12.

Figure 10:
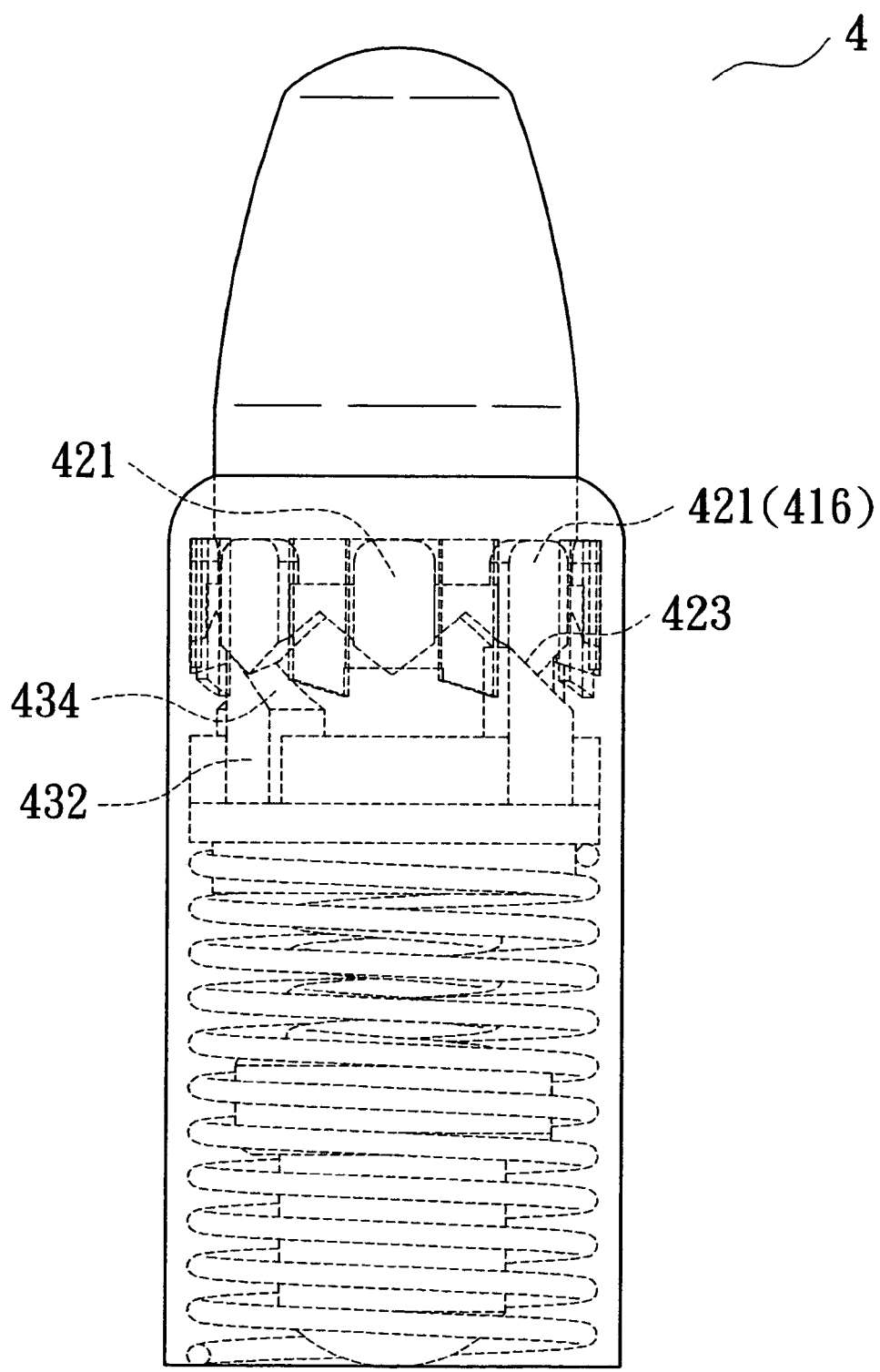
FIG. 10 is a side view of the direction-limiting mechanism, wherein the press button is not pressed.

The direction-limiting mechanism 4 further comprises a press button 42 having a lower end slidably received in the upper end of the sleeve 42 and an upper end 42 exposed outside the upper end of the sleeve 42 for manual operation. Formed on an outer periphery of the lower end of the press button 42 are a plurality of annularly spaced protruded guiding sections 421 each having a slanted bottom face 423. A projection 424 is formed between a pair of the protruded guiding section 421 adjacent to each other and includes a substantially inverted V-shaped downwardly facing groove 422. As illustrated in FIG. 10, some of the protruded guiding sections 421 (e.g., odd-numbered ones) are initially received in the grooves 416 of the sleeve 41 and the other protruded guiding sections 422 (e.g., even-numbered ones) are superimposed on the protrusions 415 of the sleeve 41.

The direction-limiting mechanism 4 further comprises a rotary member 43 including an upper end received in the press button 42. Formed on an outer periphery of a lower end of the rotary member 43 is a flange 431 from which a plurality of annularly spaced guide ribs 432 extends. Each guide rib 432 includes a slanted top face 434, and a recession 433 is defined between a pair of the guide ribs 432 adjacent to each other. As illustrated in FIG. 10, an apex of each guide rib 432 is initially accommodated in an associated one of the downwardly facing grooves 422 of the press button 42.

The direction-limiting mechanism 4 further comprises a pressing member 44 mounted to an underside of the rotary member 42, a first elastic member 45 (e.g., a spring), a positioning member 46 mounted in the sleeve 41 and below the pressing member 44, and a second elastic member 47 (e.g., a spring). The second elastic member 47 is mounted between the pressing member 44 and the shoulder 124 of the holed seat 121 of the base 12. The first elastic member 45 is mounted inside the second elastic member 47 and between the pressing member 44 and the positioning member 46.

Figure 6:
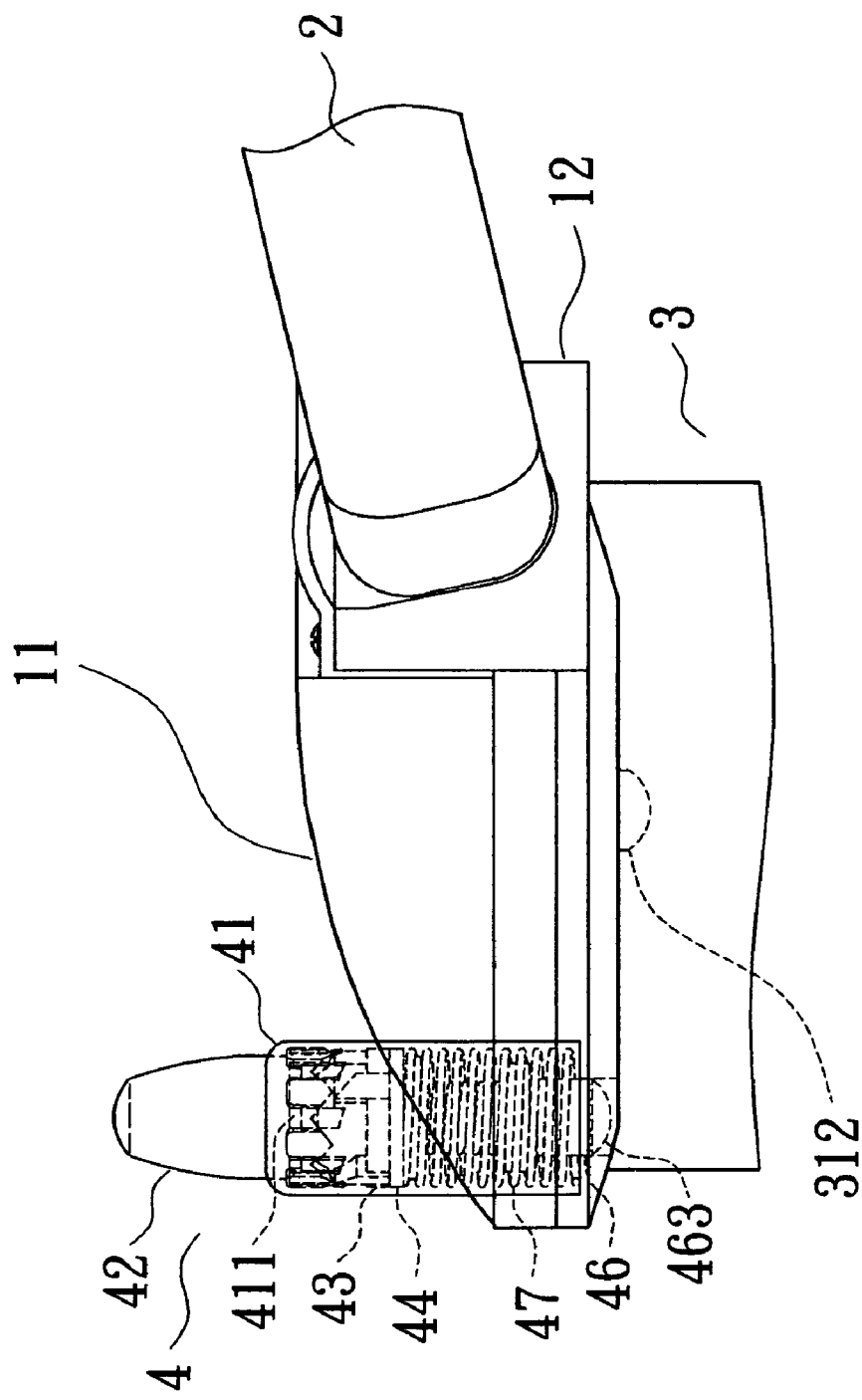
FIG. 6 is a side view of the direction-limiting device of the stroller in accordance with the present invention, wherein the wheel assembly is at a right angle with the mounting seat of the direction-limiting device.

The wheel assembly 3 can turn freely relative to the mounting seat 1. As illustrated in FIG. 6, the wheel assembly 3 can be turned to a position at a right angle with the mounting seat 1 when the press button 42 is not pressed. FIG. 8 illustrates a state of the direction-limiting mechanism 4 in which the press button 42 is not pressed and the lower end 463 of the positioning member 46 is not engaged in the positioning hole 312 of the frame 31 of the wheel assembly 3. Steering of the stroller 5 is allowed.

Figure 9:
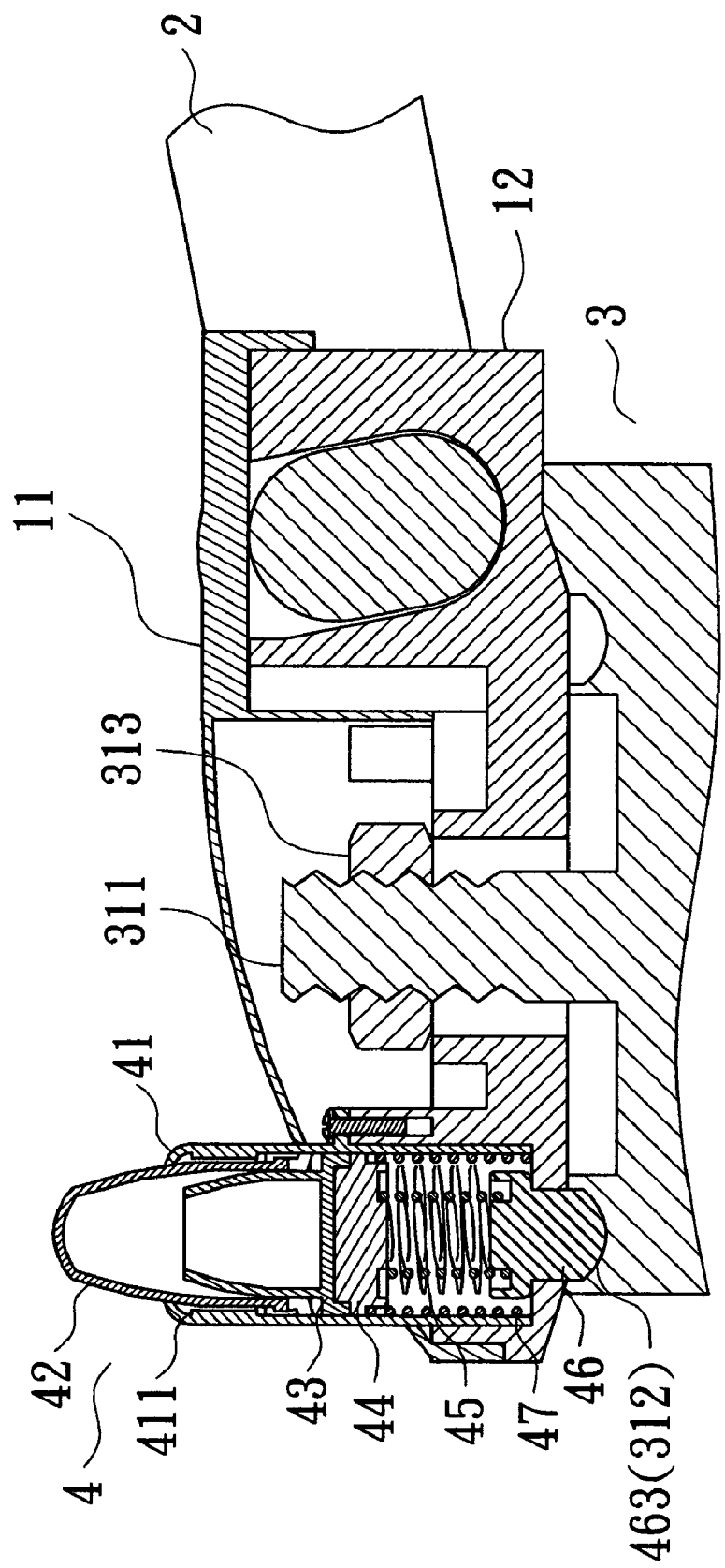
FIG. 9 is a view similar to FIG. 8, wherein a press button is pressed to prevent steering of the wheel assembly

FIG. 9 illustrates a state of the direction-limiting mechanism 4 in which the press button 42 is pressed and the lower end 463 of the positioning member 46 is engaged in the positioning hole 312 of the frame 31 of the wheel assembly 3. The wheel assembly 3 and the mounting seat 1 turn jointly. Thus, even moving on a rugged road or hitting a bump on a road, the stroller 5 will move straightly forward or rearward without the risk of turning over.

Detailed operation of the direction-limiting mechanism 4 will now be described with reference to FIGS. 10 through 17.

Referring to FIG. 10, when the press button 42 is not pressed, the lower end 463 of the positioning member 46 is not engaged in the positioning hole 312 of the frame 31 of the wheel assembly 3, best shown in FIG. 8. As illustrated in FIG. 10, the slanted bottom face 423 of each guide section 421 of the press button 42 rests on the slanted top face 434 of the associated guide rib 432 of the rotary member 43. Further, each guide section 421 of the press button 42 and the associated guide rib 432 of the rotary member 43 are confined in an associated groove 416 of the sleeve 41.

Figure 11:
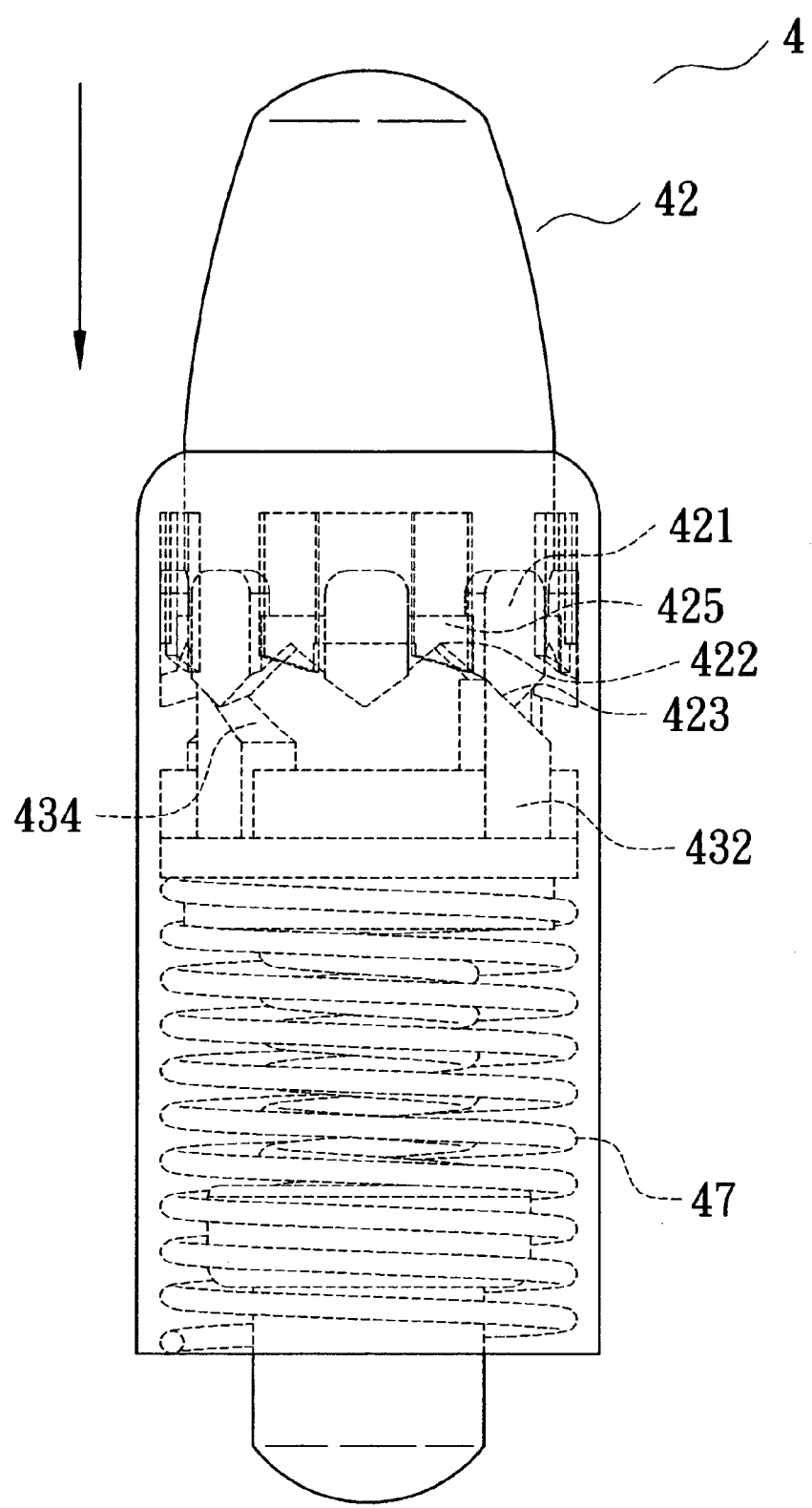
FIG. 11 is a view similar to FIG. 10, wherein the press button is pressed.
Figure 12:
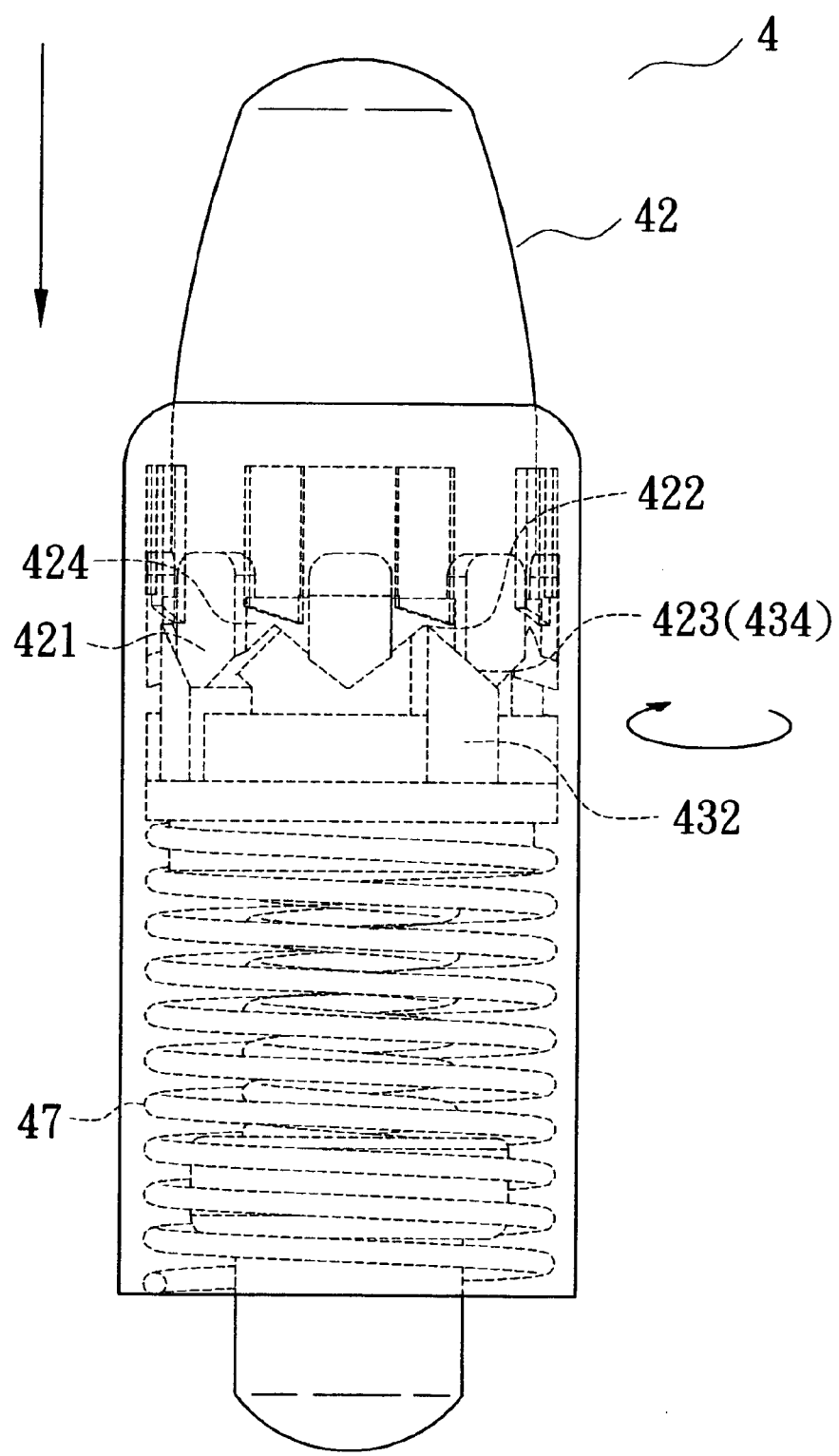
FIG. 12 is a view similar to FIG. 11, illustrating a transition state of the direction-limiting mechanism.

Referring to FIG. 11, when the press button 42 is pressed, the rotary member 43, the pressing member 44, and the positioning member 46 are moved downward and the first and second elastic members 45 and 47 are compressed. Further, the slanted bottom face 423 of each guide section 421 of the press button 42 presses against the slanted top face 434 of the associated guide rib 432 of the rotary member 432, causing the rotary member 43 to turn in one direction (e.g., clockwise), as shown in FIG. 12. Returning force of the second elastic member 47 urges the apex of the slanted top face 434 of each guide rib 432 of the rotary member 43 to come into contact with an apex of the downwardly facing groove 422 of an associated projection 424 of the sleeve 42.

Figure 13:
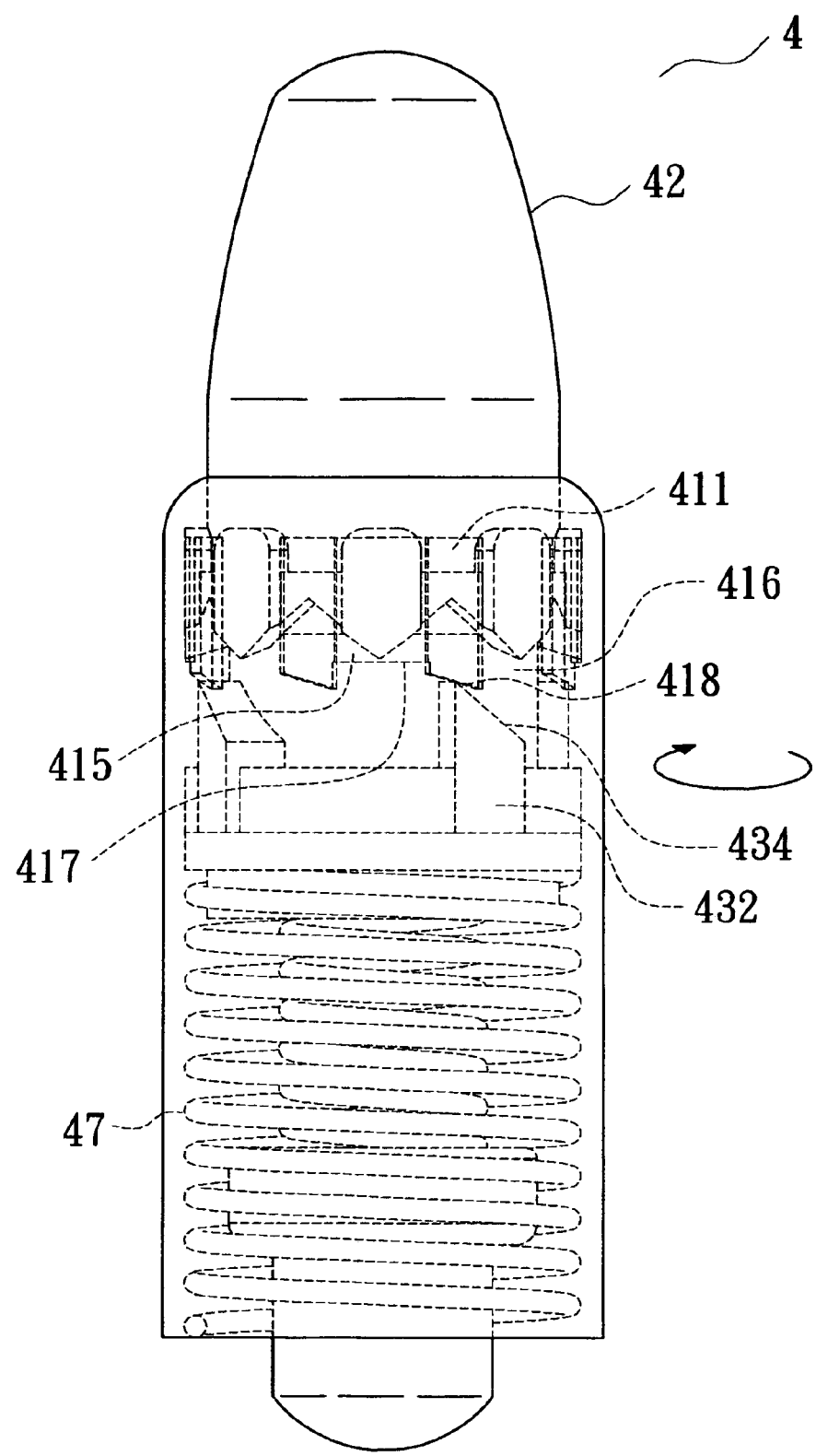
FIG. 13 is a view similar to FIG. 10, illustrating another transition state of the direction-limiting mechanism.

When the pressing force is released, the slanted top face 434 of each guide rib 432 of the rotary member 43 is disengaged from and not aligned with the associated groove 416 of the sleeve 41. As illustrated in FIG. 13, the apex of the slanted top face 434 of each guide rib 432 of the rotary member 43 is moved to a position in contact with the slanted bottom face 418 of an associated rib 411 of the sleeve 41 under the action of the returning force of the second elastic member 47.

Figure 14:
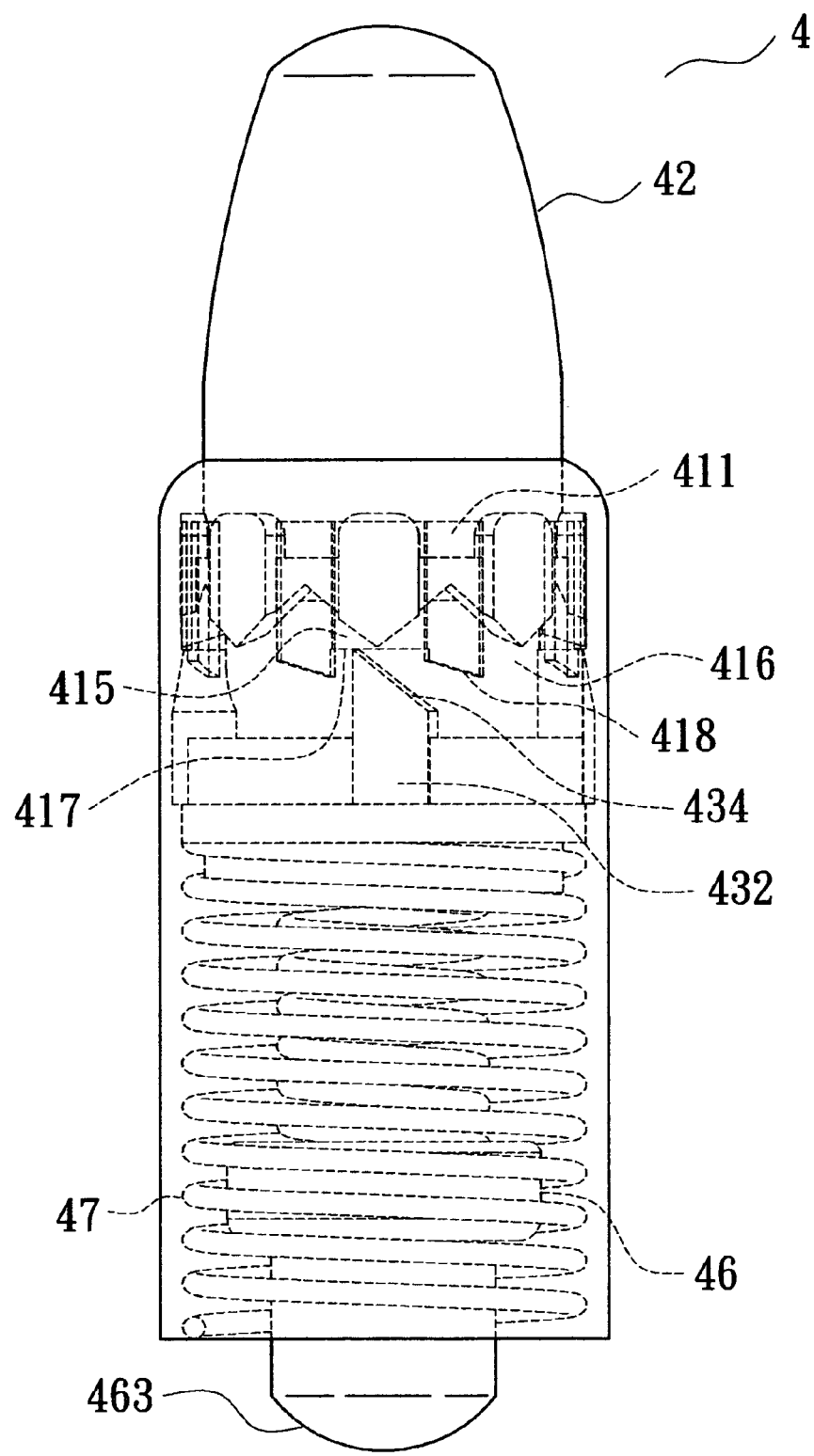
FIG. 14 is a view similar to FIG. 13, wherein the direction-limiting mechanism is in an operative state.

Referring to FIG. 14, the apex of the slanted top face 434 of each guide rib 432 of the rotary member 43 moves across the slanted bottom face 418 of the associated rib 411 to the bottom retaining edge 417 of the associated protrusion 415 adjacent to the associated rib 411 under the action of the continuous returning force of the second elastic member 47. Upward movement of the rotary member 43 is stopped by the bottom retaining edges 417 of the fixed sleeve 41, and the lower end 463 of the positioning member 46 is retained in an extended state and thus engaged in the positioning hole 312 of the wheel assembly 3, as shown in FIG. 9. As mentioned above, the wheel assembly 3 and the mounting seat 1 turn jointly. Thus, even moving on a rugged road or hitting a bump on a road, the stroller 5 will move straightly forward or rearward without the risk of turning over.

Figure 15:
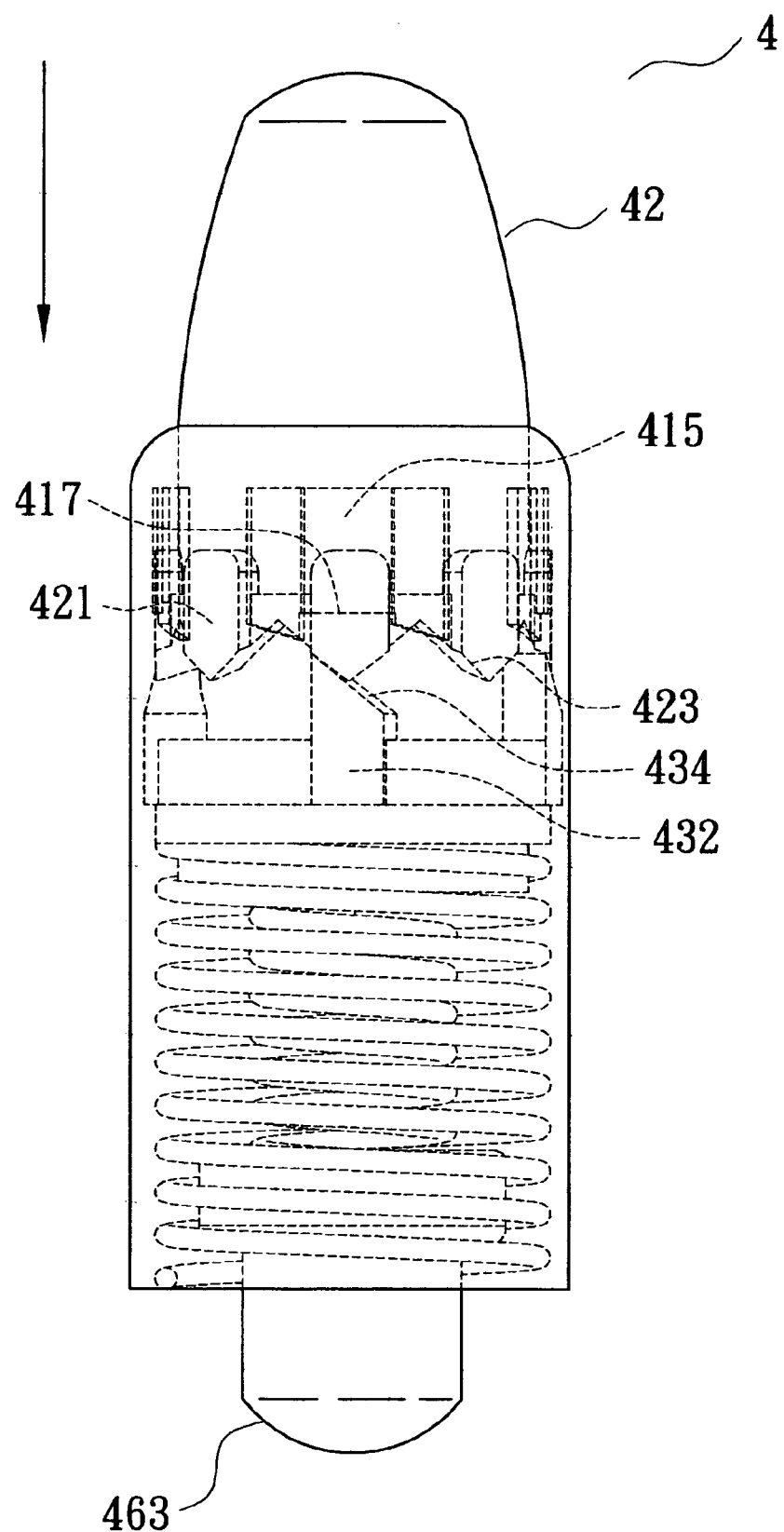
FIG. 15 is a view similar to FIG. 14, wherein the press button is pressed again.

Referring to FIG. 15, when the press button 42 is pressed again, the slanted bottom face 423 of each protruded guiding section 421 of the press button 42 presses against the slanted top face 434 of each guide rib 432 of the rotary member 43 and thus moves the rotary member 43 downward and turns the rotary member 43. In this case, the guide ribs 432 of the rotary member 43 are disengaged from the retaining edges 417 of the sleeve 41.

Figure 16:
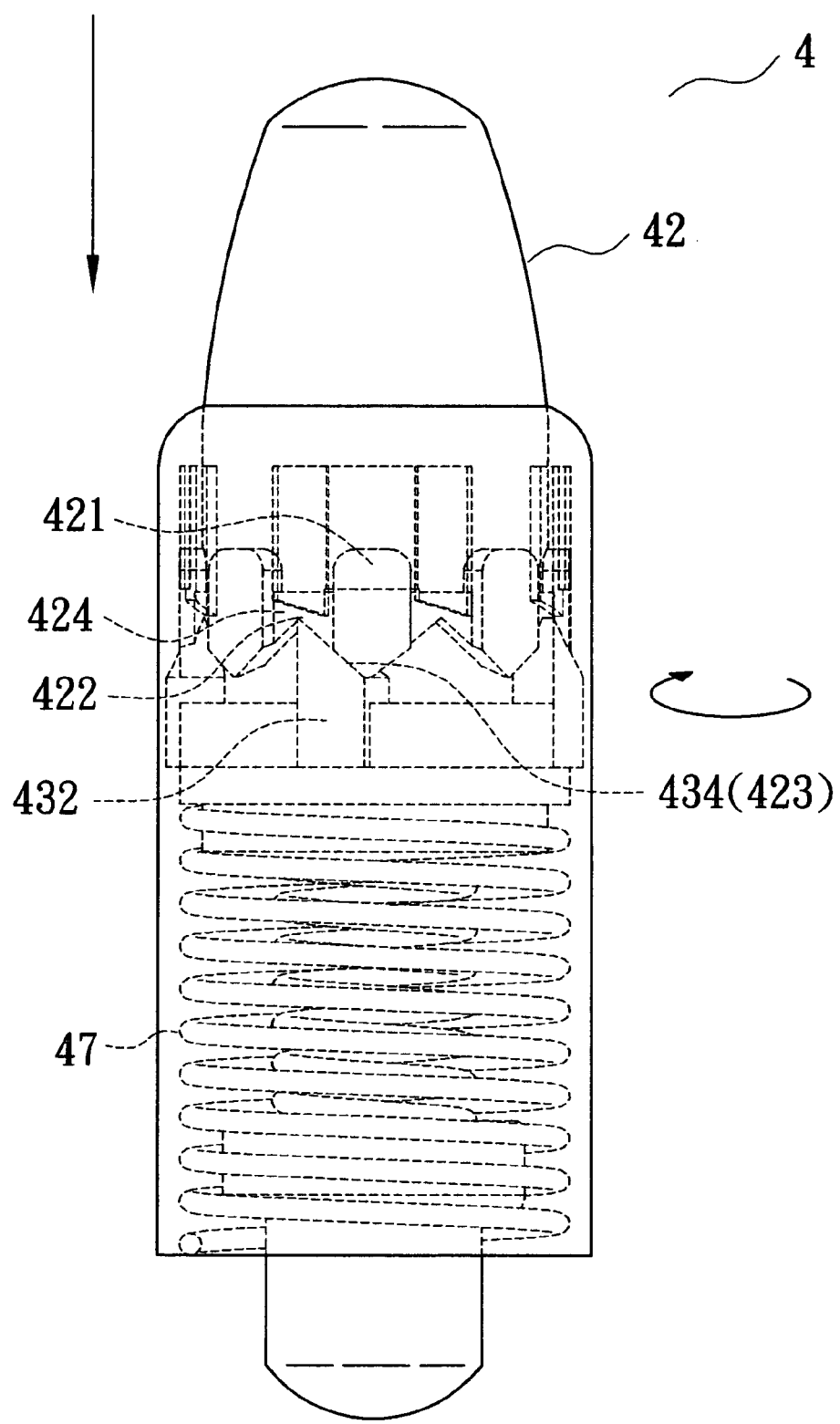
FIG. 16 is a view similar to FIG. 15, illustrating a transition state of the direction-limiting mechanism.

Referring to FIG. 16, continuous pressing of the press button 42 causes the rotary member 43 to turn in a direction (e.g., clockwise). This is because the slanted bottom face 423 of each protruded guiding section 421 of the press button 42 keeps pressing against the slanted top face 434 of each guide rib 432 of the rotary member 43 until the slanted top face 434 of each guide rib 432 of the rotary member 43 comes in contact with the apex of the downwardly facing groove 422 of an associated projection 424 of the press button 42.

Figure 17:
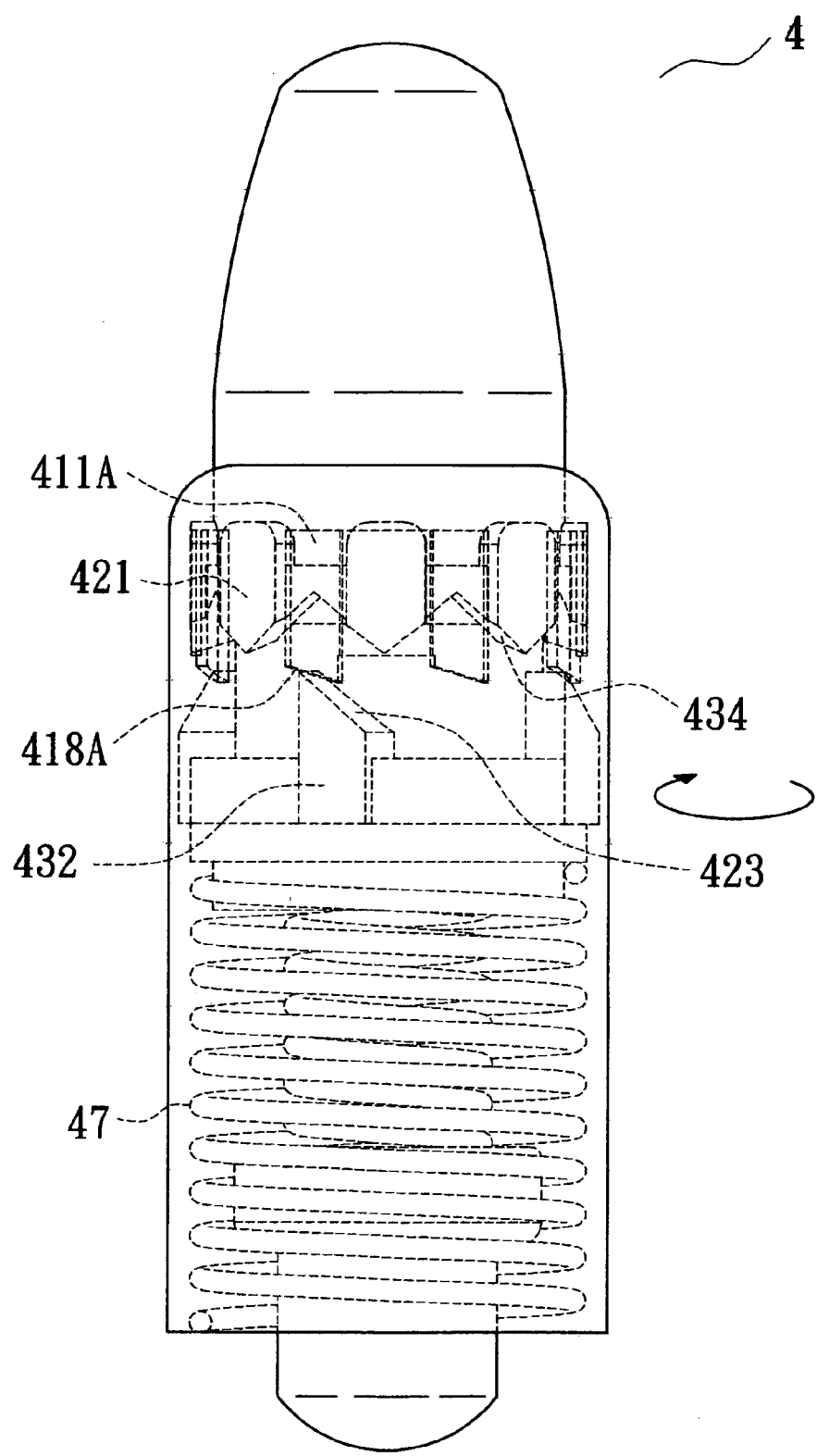
FIG. 17 is a view similar to FIG. 16, illustrating another transition state of the direction-limiting mechanism.

Referring to FIG. 17, when the pressing force is released, due to that fact that the slanted bottom face 423 of each protruded guiding section 421 of the press button 42 keeps pressing against the slanted top face 434 of each guide rib 432 of the rotary member 43 under the action of the returning force of the second elastic member 47, the apex of the slanted top face 434 of each guide rib 432 of the rotary member 43 moves transversely to the slanted bottom face 418A of an adjacent rib 411A under the action of the returning force of the second elastic member 47.

Since the bottom face 418A of the adjacent rib 411A is slanted, the returning force of the second elastic member 47 further urges the apex of the slanted top face 434 of each guide rib 432 of the rotary member 43 to turn to a position shown in FIG. 10, in which each guide section 421 of the press button 42 and the associated guide rib 432 of the rotary member 43 are confined in an associated groove 416 of the sleeve 41. The lower end 463 of the positioning member 46 is moved upward and thus disengaged from the positioning hole 312 of the frame 31 of the wheel assembly 3 under the action of the returning force of the second elastic member 47. Thus, the wheel assembly 3 can turn freely relative to the mounting seat 1, as mentioned above.

It is noted that the cover 11 can be omitted without affecting operation and function of the direction-limiting device in accordance with the present invention. It is further noted that when the positioning member 46 is pressed downward, the first elastic member 45 provides a buffering function in which the positioning member 46 can slide along the top face of the seat 1 until it reaches the positioning hole 312 of the wheel assembly 3. Namely, the press button 42 can be pressed even the positioning member 46 is not aligned with the positioning hole 312. The user may press the press button 42 and then swivel the base 12 until the positioning member 46 is aligned wit the positioning hole 312 of the wheel assembly 3.

Although a specific embodiment has been illustrated and described, numerous modifications and variations are still possible without departing from the essence of the invention. The scope of the invention is limited by the accompanying claims.

What is claimed is:

1. A direction-limiting device for a stroller, comprising:
   a mounting seat (1) comprising a base (12) adapted to be coupled to a frame of a stroller, the base comprising a holed seat (121), the holed seat including a shoulder (124) in a lower end thereof and a hole (120);
   a wheel assembly (3) comprising a frame (31) pivotally connected to the base (12) and a wheel (32) rotatably supported by the frame, the frame comprising a positioning hole (31) in a top side thereof; and
   a direction-limiting mechanism (4) comprising a sleeve (41), a press button (42), a rotary member (43), a pressing member (44), a first elastic member (45), a positioning member (46), and a second elastic member (47);
   the sleeve (41) comprising a lower end securely received in the holed seat (121) of the base (12) and an upper end, the sleeve further comprising a longitudinal hole (410) delimited by an inner periphery, a plurality of annularly spaced ribs (411) being formed on the inner periphery of the sleeve (41) and each including a slanted bottom face (418), the ribs (411) being spaced by a plurality of protrusions (415) and a plurality of grooves (416) that are alternately disposed, each said protrusion (415) including a bottom retaining edge (417);

the press button (42) comprising a lower end slidably received in the upper end of the sleeve (42) and an upper end for manual operation, a plurality of annularly spaced protruded guiding sections (421) being formed on an outer periphery of the lower end of the press button (42) and each having a slanted bottom face (423), a projection (424) being formed between a pair of the protruded guiding sections (421) adjacent to each other and including a substantially inverted V-shaped downwardly facing groove (422), the rotary member (43) comprising an upper end received in the press button (42) and a lower end, a flange (431) being formed on an outer periphery of the lower end of the rotary member (43), a plurality of annularly spaced guide ribs (432) extending from the flange (431) and each including a slanted top face (434) and an apex, with a recession (433) being defined between a pair of the guide ribs (432) adjacent to each other;

the pressing member (44) being mounted to an underside of the rotary member (42);

the positioning member (46) being mounted in the sleeve (41) and below the pressing member (44), the positioning member including a lower end (463);

the second elastic member (47) being mounted between the pressing member (44) and the shoulder (124) of the holed seat (121) of the base (12);

the first elastic member (45) being mounted inside the second elastic member (47) and between the pressing member (44) and the positioning member (46);

wherein when the press button (42) is in an initial position, some of the protruded guiding sections (421) are received in the grooves (416) of the sleeve (41) and the other protruded guiding sections (421) are superimposed on the protrusions (415) of the sleeve (41), the apex of each said guide rib (432) is accommodated in an associated one of the downwardly facing grooves (422) of the press button (42), the lower end of the positioning member (46) is disengaged from the positioning hole (312) of the wheel assembly (3) to allow free pivotal movement of the wheel assembly (3) relative to the base (12);

wherein when the press button (42) is pressed and then released, the rotary member (43) is moved downward and turned in a direction, the apex of the slanted top face (434) of each said guide rib (432) of the rotary member (43) moves across the slanted bottom face (418) of an associated one of the ribs (411) to the bottom retaining edge (417) of an associated one of the protrusions (415) adjacent to the associated rib (41) under the action of returning force of the second elastic member (47), the lower end (463) of the positioning member (46) is engaged in the positioning hole (312) of the wheel assembly (3), allowing joint movement of the wheel assembly (3) and the base (12);

wherein when the press button (42) is pressed again and released, the rotary member (43) is moved downward and turned in the direction, the apex of the slanted top face (434) of each said guide rib (432) of the rotary member (43) moves transversely to the slanted bottom face (418A) of an adjacent rib (411A), the rotary member (43) and the positioning member (46) are then moved upward under the action of the returning force of the second elastic member (47), the lower end (463) of the positioning member (46) is disengaged from the positioning hole (312) of the wheel assembly (3).

2. The direction-limiting device for a stroller as claimed in claim 1, with the mounting seat (1) further comprising a cover (11) mounted on top of the base (12), the cover (11) comprising a through-hole (111) through which the upper end of the press button (42) extends.

3. The direction-limiting device for a stroller as claimed in claim 1, with the sleeve (41) further comprising a key (412), with the holed seat (121) comprising a key groove (123) for engaging with the key (412).

4. The direction-limiting device for a stroller as claimed in claim 1, with the sleeve (12) further comprising an engaging member (413) on an outer periphery thereof, with a screw (44) extending through the engaging member (413) for fixing the sleeve (12) to the base (12).

* * * * *